United States Patent Office 3,682,817
Patented Aug. 8, 1972

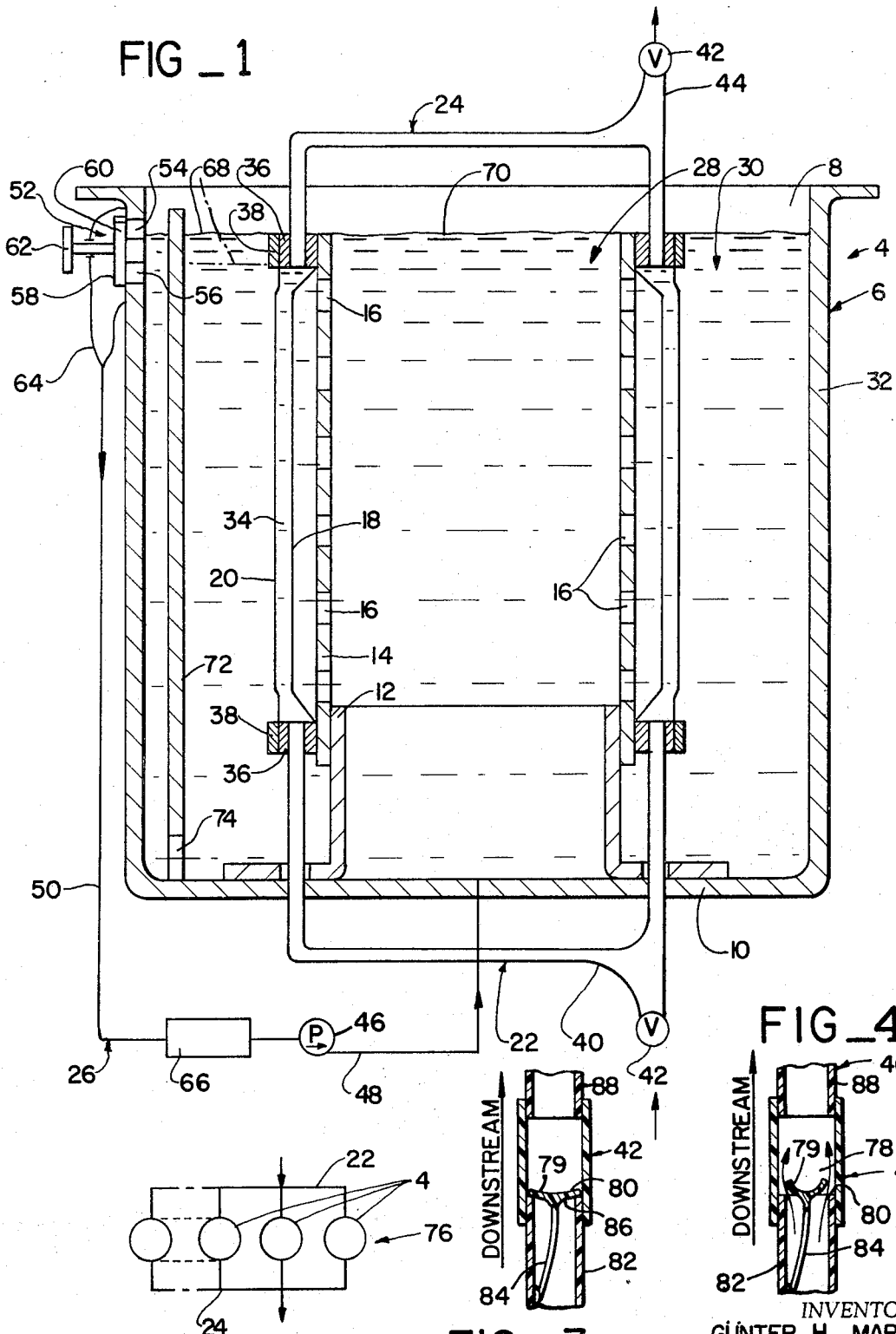

3,682,817
DIALYZER
Günter H. Marx, Munich, Germany, assignor to Bio-Cal Instrument Company, Richmond, Calif.
Filed Aug. 7, 1970, Ser. No. 61,961
Int. Cl. B01d *31/00, 13/00*
U.S. Cl. 210—22                                                  20 Claims

ABSTRACT OF THE DISCLOSURE

A dialyzer in which a pair of spaced apart, upright, opposing semipermeable membranes separate independent bodies of a dialysate. Retentate is flowed through the space between the membranes to effect an ion exchange between the retentate and the dialysate. The fluid level of one of the dialysate bodies is intermittently raised and lowered to subject the retentate between the membranes to varying pressures and thereby pump the retentate, with the help of proper valving, from the space between the membranes to an outlet.

BACKGROUND OF THE INVENTION

Dialyzers are presently in wide use. The perhaps most common use is its application as an artificial kidney. Such dialyzers must provide for an effective ion exchange between the retentate, say the patient's blood, and a dialysate. This requires relatively large areas of osmotic membranes past which the two fluids flow. In addition, the dialyzer must be constructed so that the blood stream passing through it experiences a minimal pressure drop and/or it must include a pump to make up for the pressure drop in the blood stream passing through the dialyzer. It is well known that the pumping of blood is critical because of the susceptibility of blood cells to damage when passing through the pump. Consequently, available blood pumps are expensive even though their operating characteristics are not always fully satisfactory.

Many attempts have heretofore been made to construct efficient and convenient dialyzers. Almost universally this involved the provision of an interior central tubular member through which a first fluid is passed and an exterior member through which a second fluid is passed which concentrically surrounds the interior tubular member. The inner tube is constructed of an osmotic material to enable an ion exchange between the two fluids. To obtain the necessary ion exchange surface area the overall length of the tubes had to be great. Many suggestions have been made on how to best arrange the concentric tubes to provide an apparatus with manageable overall dimensions while providing the required tube length.

Since substantial pressure drops were encountered in the tubes, which had lengths of many feet, prior art dialyzers usually employed pumps. These pumps have the above described economic and operational drawbacks which, however, were accepted to provide workable dialyzers that could be employed as artificial kidneys. Thus, prior art dialyzers, and particularly prior art artificial kidneys were bulky, expensive and operationally less than fully satisfactory.

SUMMARY OF THE INVENTION

The present invention provides a compact dialyzer which incorporates a retentate pumping mechanism that is gentle and is ideally suited for pumping blood without damaging blood cells. In accordance with the method of the present invention a first fluid is placed between opposing ionpermeable membranes, a body of a second fluid is placed against a membrane, and a second body of the second fluid is placed against the other membrane so that the membranes separate the first and second bodies. The relative pressures between the bodies are intermittently varied to thereby induce a flow and a continuous replacement of the first fluid between the membranes.

The apparatus of the present invention comprises spaced apart, opposing membranes defining a sealed inner space, means forming an inlet and an outlet to the inner space for flowing the first fluid therethrough, and container means for first and second bodies of the second fluid. The container means position a body on the exterior side of each membrane so that the membranes and the inner space are disposed between bodies. Means are provided that vary the relative effective fluid pressure exerted by the bodies against the membranes to induce a first fluid flow from the inner space to the outlet. Valve means prevent a back flow of the first fluid.

In the preferred form of the invention the membranes are defined by inner and outer tubular, semipermeable members which are maintained in an upright position interiorally of a vessel and which have their lower ends sealed to a floor of the vessel to define independent inner and outer containers for two independent bodies of the dialysate. Upon a lowering and raising of the dialysate fluid level in one of the independent bodies the pressure acting on one of the membranes first decreases, thus permitting that membrane to bulge outwardly and increase the volume of the inner space between the membranes and, thereafter, the pressure acting on that membrane increases, thereby compressing the membranes towards each other and reducing the inner space. With the proper valving, particularly with a one-way valve in the intake to the inner space, a gentle fluid flow from the inner space to an outlet is induced.

One or more dialyzers of the present invention are combined to provide the necessary capacity for an artificial kidney. The inlets and outlets for the space between the membranes are hooked up with an artery and vein, respectively, of a patient and blood is flowed through the dialyzers. The dialysate is circulated from the first to the second body of the dialysate and the dialysate level in the second body is cyclically raised and lowered to pump the blood in the inner space between the membranes through the outlet into the patient's vein. The dialysate itself can be recirculated with proper regeneration to keep the waste products in the dialysate at the required low level.

The dialyzer of the present invention is simple to construct since the relatively large diameter inner and outer tubular membranes eliminate the need for long lengths of tubing that must be skillfully coiled and arranged in a limited space. The membrane area for a given diameter of the tubular membranes is virtually doubled by the provision of spaced inner and outer tubular membranes past which the dialysate flows. Additionally, the pumping action obtained through changes in the fluid level of one of the dialysate bodies provides a gentle and gradual pressure change in the space between the membranes which gently induces a blood flow towards the vein to which the apparatus is connected. Blood cell damage from high forces encountered in prior art pumps is thereby eliminated to provide a low cost, compact and efficient dialyzer which has operating characteristics far superior to those of prior art devices.

BRIEF DESCRIPTION OF THE DRAWINGS

FIG. 1 is a schematic elevational view, in section, of a dialyzer constructed in accordance with the present invention;

FIG. 2 is a schematic illustration of the combination of a plurality of dialyzers into an artificial kidney machine;

FIG. 3 is a fragmentary, enlarged cross-sectional view of a one-way valve constructed in accordance with the invention and particularly well suited for use with the dialyzer illustrated in FIG. 1 and shows the valve in its closed position; and FIG. 4 is a fragmentary, cross sectional view similar to FIG. 3 but illustrates the one-way valve in its open position.

DESCRIPTION OF THE PREFERRED EMBODIMENTS

Referring to the drawings, a dialyzer 4 constructed in accordance with the present invention broadly comprises a main outer vessel or container 6 which has an open upper end 8 and a flat, substantially horizontal bottom 10. A flange 12 is concentrically secured to the bottom and their interfaces are sealed with suitable gaskets (not separately shown) or the like. An upwardly extending cylindrical perforated tube 14 having a plurality of openings 16 is secured to flange 12 and mounts a pair of concentric tubular members or membranes 18 and 20 constructed of a semipermeable material such as cellulose acetate. The membranes define an inner chamber through which a first fluid can flow via intake means 22 and outlet means 24. A second fluid is circulated by circulation means 26 from adjacent the top of vessel 6 to the bottom of an inner or core body 28 defined by flange 12, a portion of bottom 10 and the upwardly extending inner tubular membrane 18. When the fluid level of the fluid core body extends to the upper end of the membranes the fluid spills over, in a radially outward direction, into the remainder of vessel 6 and forms an annular outer body 30 of the second fluid defined by upright outer vessel walls 32, the outer portion of vessel bottom 10 and the upwardly extending outer membrane 20.

Upon flowing a retentate through inner space 34 between membranes 18 and 20 and circulating a diffusate through vessel 6 in the above described manner dialysis between the two fluids takes place. Dialysis is the passage of diffusable ions or molecules through a selectively permeable intervening septum from one gaseous or liquid solution or mixture into another. Such processes are used in industry and in laboratories for a variety of separation and purifications, depending on differences in diffusion coefficients in the component substances. One application for which the apparatus of the present invention is particularly well adapted is its use as an artificial kidney to purify and dialyze blood by removing therefrom toxic components and transferring the components through the membrane to the dialysate. The apparatus can equally successfully be employed to concentrate a solution or suspension in the preparation of vaccines or for other applications in which the transfer of a solute from a solution to another solution is desired.

In the following description of the apparatus and method of the present invention it is specifically described as constructed and operated for functioning as an artificial kidney to remove toxic substances from a blood stream. It will be obvious that the apparatus can be similarly used for dialyzing other substances.

The inner and outer tubular membranes 18 and 20 are substantially concentric with respect to each other so that inner space 34 has an annular cross section. The upper and lower ends of the membranes are separated by annular rings 36 of a square or rectangular cross section which are disposed about tube 14 so that the inner membrane 18 separates the tube from the rings. The membranes are constructed of a thin cellulose acetate or a like material and they are bonded to the inner and outer faces of the annular rings as well as to the outer face of tube 14 contacted by the inner tubular member with a primer of a silicone resin or the like and a layer of silicone rubber to provide a seal and a mechanical interlock. A preferably split outer ring 38 is placed about annular rings 36 and is suitably tightened to firmly retain outer tubular member 20 to the annular rings and to bias the annular rings against tube 14. A stable upright structure is thereby formed.

Intake means 22 comprise a branched intake tube 40 which includes a one-way valve 42 that permits blood to stream towards inner space 34 and prevents its backflow therefrom. Outlet means 24 also include a branched tube 44 in which another one-way valve 42 permitting blood to stream away from inner chamber 34 and preventing it from backflowing through the branched outlet tube into the inner chamber. Tubes 40 and 44 are inserted through bores in annular rings 36 and are conventionally secured to the rings as by bonding them thereto. Thus the connection of inlet tube 40 to a patient's artery via suitable connecting hoses and fittings (not shown) and connection of outlet tube 44 to a patient's vein, also via suitable conduits and fittings (not shown), establishes a blood flow from the intake means via inner space 34 and past the outlet means. This blood flow is subject to pressure losses from friction of the blood stream along the walls of the conduits and membranes so that the flow rate through the device can be seriously impaired. To overcome this shortcoming a blood flow through the device is externally induced in accordance with the method of the present invention and as fully described hereinafter.

Circulation means 26 comprises a conduit 48 that connects the pressure outlet of a pump 46 with the portion of the bottom of vessel 6 surrounded by flange 12. Conduits 50 connect the suction side of the pump with an outlet 52 on vessel 6 adjacent the upper end thereof. The outlet is schematically illustrated and comprises a pair of vertically spaced openings 54 and 56 to which a disk 58 having an aperture 60 is rotatably and sealably secured. A suitable drive 62 rotates disk 58 and alternatingly aligns aperture 60 with the upper and the lower openings 54 and 56 in vessel 6. A suitable connection flange 64 is provided for collecting fluid discharged through disk aperture 60 when it is aligned with the upper or the lower vessel opening and transferring it to conduit 50. The circulating means further includes a regenerator 66 of a conventional construction for the removal of toxic substances from the dialysate so that the dialysate can be recirculated without an increase in its toxicity.

In use blood is flowed through inner chamber 34 in the aforementioned manner. Dialysate is circulated by initially introducing it into inner or core space 28 until the fluid level rises to the level of the upper surface of the tubular membranes 18 and 20 and/or of the annular ring 36. Thereafter the dialysate spills over into the annular outer space 30 until the fluid level therein rises to the height of upper opening 54 in vessel 6. From there the fluid discharges through the upper opening and through disk aperture 60 back to pump 46. The upper opening 54 is so positioned that at that point the fluid level 68 in outer space 30 is about level with the fluid level in inner space 28. Thereafter drive means 62 is actuated to rotate disks 58 at a rate of about 10 to about 20 revolutions per minute. After disk aperture 60 leaves its alignment with upper vessel opening 54 the fluid level rises slightly until the disk aperture becomes aligned with lower vessel opening 56 whereupon the fluid level in the outer space 30 falls to the level of the lower opening as indicated in phantom lines in the drawing. Continued rotation of the disk thereafter again closes the lower vessel opening 56 and the fluid level in the outer space 30 is permitted to rise until it reaches the lower end of upper opening 54 or until the disk aperture becomes aligned with the lower vessel opening 56 again.

While fluid level 68 in the outer space 30 cyclically rises and falls the fluid level 70 in the inner space 28 remains constant. Consequently inner tubular membrane 18 is subjected to constant hydraulic pressure while the hydraulic pressure acting on outer tubular membrane 20 cyclically increases and decreases. This change in the pressure on the outer membrane in turn compresses and expands the membrane and increases and decreases the volume of inner space 34 correspondingly. Each volume decrease in inner space 34, when fluid level 68 rises, induces a blood flow through outlet tubes 44. A corresponding blood flow through inlet tubes 40 is prevented by one-way valve 42 mounted in the inlet tube. Upon an increase of inner space 34, when fluid level 68 falls, blood is permitted to enter the inner space via intake tubes 40 and one-way valve 42 mounted thereto. Simultaneously check valve 42 mounted in outlet tubes 44 prevents a backflow of blood through the outlet tubes to the inner space between the membranes. Thus, each time fluid level 68 falls from and rises back to its initial level a complete pumping cycle comprising an intake stroke and an output stroke takes place. The pumping action is obtained from a gentle compression of the outer tubular membrane with respect to the inner tubular membrane 18 which avoids high acceleration and/or deceleration forces encountered in prior art pumps or mechanical impacts which cause damage to or destruction of blood cells. Thus, the inexpensive provision of vertically spaced holes in vessel 6 and rotating disk 58, or other means for cyclically raising and lowering fluid levels which will come readily to the mind of those skilled in the art, provides a high quality, non-cell-destructing pumping action which can be incorporated in the dialyzer of the present invention to eliminate undesirable pressure drops across the dialyzer.

To assure that dialysate spilling into the outer annular space 30 passes along outer membrane 20 and to prevent portions of the dialysate in the outer space from remaining stationary and saturated with toxic substances it is preferred to provide a baffle wall 72 that extends across openings 54 and 56 in vessel 6 and downwardly thereof to vessel bottom 10. An opening 74 in the baffle wall enables the dialysate to rise between the baffle wall and the adjacent portion of upright vessel wall 32 towards vessel openings 54 and 56 for discharge into conduit 50 and recirculation.

In the presently preferred form of the invention for use as an artificial kidney, nine separate but interconnected dialyzers 4 are provided. Each dialyzer has an inner tubular membrane diameter of between about 30 to about 35 mm. and an effective membrane height of about 450 mm. to yield a total ion exchange surface of approximately 1 m.². This permits a flow rate of about 200 to 250 ml. of blood per minute through the artificial kidney to obtain a satisfactory cleansing of the blood. Pump 46 is dimensioned to pump approximately 300 liters of dialysate every eight hours through the inner and outer spaces 28 and 30 of vessel 6. The dialysate withdrawn from the vessel is regenerated so that all or at least a major portion of the dialysate can be recirculated to reduce overall costs. The upper and lower openings 54 and 56 in vessel 6 are furthermore positioned so that fluid level 68 in outer space 30 rises and falls by between about 2 to about 5 cm. during each cycle to obtain the desired pumping pressure in interior space 34 between the inner and the outer membranes.

It is presently preferred to construct one-way valve 42 by providing a disc 79 constructed of a flexible, resilient material which is inert to blood and which is positioned in an interior, cylindrical valve chamber 78. The periphery of the disc is of a slightly lesser diameter than the diameter of the chamber and can rest against a sealing surface 80 defined by the end of an upstream tubular member 82 defining an upstream portion of conduit 40. A flexible connector 84 has an end secured to an upstream side 86 of disc 79, is coaxial with respect to the disc, and has its other end secured to the interior side of tubular member 82 as by bonding thereto. Connector 84 can be integrally constructed with the disc or it can be bonded thereto, and it is installed so that it biases the upstream sides 86 of the disc against sealing surface 80 when the valve is in inoperative position.

In operation, when the upstream pressure in tubular member 82 exceeds the downstream pressure in chamber 78 and a downstream tubular member 88 of a conduit 40, that is when the fluid level in outer space 30 of the dialyzer is lower than in inner space 28, the excess upstream pressure biases the peripheral portions of disc 79 in a downstream direction and thereby unseats upstream side 86 of the disc from sealing surface 80. Fluid flow in a downstream direction, as indicated by the arrow in FIG. 4, takes place.

When the fluid pressure in upstream tubular member 82 is exceeded by the fluid pressure in chamber 78 and downstream member 88, that is when the fluid level in outer space 30 of the dialyzer is about level with the fluid in inner space 28 the excess pressure in the chamber biases the peripheral portions of disc 79 in an upstream direction and against sealing surface 80. The one-way valve is thus closed and prevents a back flow of fluid from the downstream tubular member 88 through chamber 78 and into upstream tubular member 82 until such time as the fluid pressure in the upstream tubullar member again exceeds the fluid pressure in chamber 78.

I claim:

1. A method of continuous dialysis comprising the steps of placing a first fluid between opposing, upright ion-permeable membranes, placing a first body of a second fluid against one of the membranes, placing a second body of the second fluid which is independent of the first body against the other membrane so that the membranes separate the first and second bodies, and intermittently changing the relative heights of the bodies to intermittently form and release hydrostatic pressure differentials between the bodies and thereby induce a flow and a continuous replacement of the first fluid between the membranes.

2. A method according to claim 1 including the step of flowing the first and second fluids in like directions.

3. A method according to claim 1 wherein the membranes define an upright annular passage for the first fluid, wherein the first body of the second fluid is defined by an upright column of the first fluid, and wherein the second body of the second fluid is defined by an annular upright column of the second fluid surrounding the annular passage, and wherein the step of changing the relative heights of the second fluid bodies comprises the steps of maintaining the fluid level of one of the columns substantially constant and intermittently varying the fluid level of the other one of the columns to subject the inner and outer membranes to varying pressures that are transmitted to the first fluid and cause the first fluid to flow through the passage.

4. A method of dialyzing blood for the removal of waste products from the blood and inducing a blood flow to prevent substantial pressure drops in the blood flow comprising the steps of: directing a blood stream through an inlet into a space between opposing, spaced apart ion-permeable membranes, flowing an independent body of a dialysate on the side of each membrane opposite the space to cause an ion exchange and separation of the waste products from the blood and their transfer into the dialysate, intermittently raising and lowering the fluid level of one of the bodies with respect to the fluid level of the other one of the bodies to subject the blood stream in the space to cyclically varying, relatively slowly, rising and falling pressure variations to discharge blood from the space to an outlet, blocking the inlet while the blood pressure in the space is relatively higher, and blocking the outlet while the blood pressure in the space is relatively lower.

5. A method according to claim 4 including the step of circulating the dialysate from one body to the other body and recirculating the dialysate by withdrawing it from the other body, regenerating it, and introducing it into the one body.

6. A method according to claim 4 wherein the step of intermittently raising and lower the relative fluid level in one of the bodies comprises the steps of introducing the dialysate in one of the bodies at a constant rate, withdrawing dialysate from the one body above a predetermined fluid level, transferring the withdrawn dialysate to the other one of the bodies, and cyclically withdrawing dialysate from the other body in intervals at a rate greater than said constant rate.

7. A dialyzer comprising substantially concentric spaced apart inner and outer tubular, semipermeable membranes, means sealing an inner space defined by the membranes, means providing access to the inner space to flow a first fluid into the inner space, means for flowing a second fluid into first and second spaces at least partially defined by the inner and outer membranes, respectively, to a predetermined second fluid level and along exterior surfaces of the tubular membranes to effect an exchange of molecules between the first and second fluids through the membranes, and means for intermittently changing the relative pressures exerted by the second fluid in the first and second spaces against the membranes to simultaneously subject the membranes to different and changing forces that are transmitted to the first fluid and cause the first fluid to flow in the inner space defined by the membranes.

8. Apparatus for dialyzing fluids comprising spaced apart, opposing membranes defining a sealed inner space, means forming an inlet and an outlet to the inner space for flowing a first fluid therethrough, container means cooperating with the membranes for holding independent first and second bodies of a second fluid in contact with the opposing membranes, the container means positioning a second fluid body on an exterior side of each membrane so that the membranes and the inner space are disposed between second fluid bodies, means for varying the relative hydrostatic fluid pressure exerted by the second fluid bodies against the membranes for inducing a first fluid flow from the inner space to the outlet, and valve means preventing a back flow of the first fluid.

9. Apparatus according to claim 8 wherein the opposing membranes are defined by substantially concentric tubular members constructed of an ion-permeable material, and including means sealing ends of the tubular members to define the inner space.

10. Apparatus according to claim 9 wherein the tubular members are positioned about a substantially vertical axis, wherein the container means comprises an upright vessel surrounding the exterior of the outer tubular member and means sealing a lower end of the tubular members with a bottom member of the vessel, and including means maintaining the tubular members in their upright position.

11. Apparatus according to claim 10 including means introducing the second fluid at a substantially constant rate into the space surrounded by the inner tubular member, means permitting spillover of the first fluid into the space surrounding the outer tubular member, and wherein the pressure varying means comprises means cyclically lowering the second fluid level in the space surrounding the outer tubular member below the spillover fluid level and raising the fluid.

12. Apparatus according to claim 11 including means establishing a fluid flow longitudinally along the outer tubular member before discharge of the second fluid.

13. Apparatus according to claim 10 wherein the tubular member support means comprises an upright, substantially rigid tube having a multiplicity of perforations, means positioning the tube interiorally of the tubular members, and means securing ends of the tubular members to the tube.

14. A fluid dialyzing and pumping apparatus comprising in combination: spaced apart, concentric first and second tubular semipermeable membranes disposed in an upright position and defining an interior flow space for a retentate, means retaining an upright diffusate fluid body adjacent the inner membrane over substantially the full effective axial length of the membrane to a predetermined uppermost level, means retaining a second diffusate fluid body in a space surrounding the outer membrane over substantially the full effective axial length thereof to a level at least as high as the level of the first interior body, means permitting fluid flow from the first body to the second body, and means periodically lowering the fluid level in the second body for subjecting the first fluid in the inner space to cyclical pressure differentials and thereby pump the first fluid through the inner space and into an outlet.

15. A blood dialyzing and pumping apparatus for the removal of waste products from the blood and for withdrawing blood from the blood stream from a first blood vessel and returning it to the blood stream by pumping it into a second vessel without damaging blood cells, the apparatus comprising:
an upright outer vessel including means for raising and lowering a fluid level within the vessel between upper and lower limits;
a pair of oppositely positioned osmotic membranes defining an inner space between them for the blood flow;
means sealing the inner space;
means sealingly connecting portions of the membranes adjacent edges thereof with interior walls of the vessel to divide the vessel into independent first and second fluid holding portions, each portion extending to and terminating at a membrane;
intake means for connection to a vessel;
one-way valve means in the intake means preventing blood backflow from the inner space towards the first vessel; and
outlet means for connecting the inner space to the second vessel;
whereby the blood flow is dialyzed when the first and second portions are filled with a dialysate and fluid pressure differentials acting on the membranes from variations in the relative fluid levels in the portions through actuation of the fluid level varying means causes a gentle blood flow towards the outlet means and thereby pumps dialyzed blood back into the blood stream.

16. Apparatus according to claim 15 including means permitting spillage of the dialysate from the first to the second portion after the dialysate fluid level in the first portion reaches a predetermined level, and including means withdrawing fluid from the second portion and means introducing fluid into the first portion.

17. Apparatus according to claim 16 wherein the means introducing dialysate into the first portion includes means recirculating the withdrawn dialysate, and means regenerating the recirculated dialysate to reduce the concentration of waste products therein.

18. Apparatus according to claim 15 wherein the membranes have a tubular configuration and define substantially concentric inner and outer tubular membranes, and including means maintaining the tubular membranes in an upright position, annular bar means spacing the membranes, and means sealing and securing the tubular membranes to the annular bar means.

19. Apparatus for dialyzing fluids comprising: spaced apart, opposing membranes defining a sealed inner space, means forming an inlet and an outlet to the inner space for flowing a first fluid therethrough, container means for first and second bodies of a second fluid, the container means positioning a body of the second fluid on an exterior side of each membrane so that the membranes and the inner space are disposed between the second fluid bodies, means varying the relative effective fluid pressure exerted by the second fluid bodies against the membranes for introducing a flow of the first fluid from the inner space to the outlet, the inlet and the outlet each having means defining a substantially cylindrical chamber, means defining a substantially cylindrical sealing surface facing in a downstream direction and positioned at an upstream end of the chamber, and a flexible disc constructed of a resilient material movably disposed in the chamber for sealing with the sealing surface and preventing a flow of the first fluid in the upstream direction when the fluid pressure in the chamber exceeds the fluid pressure in a conduit member upstream of the chamber, the disc further being separated from the sealing surface for permitting a flow of the first fluid in the downstream direction when the fluid pressure in the upstream conduit member exceeds the fluid pressure in the chamber, whereby under substantially constant upstream fluid pressure acting on the disc disposed in the inlet and substantially constant downstream fluid pressure acting on the disc disposed in the outlet a relatively low fluid pressure exerted by the first and second bodies of the second fluid against the membranes causes a flow of the first fluid past the inlet disc and prevents a back flow of the fluid past the outlet disc into the inner space of the dialyzer, and a relatively high fluid pressure exerted by the first and second bodies of the second fluid against the membranes causes a flow of the first fluid past the outlet disc and prevents a back flow of the first fluid past the inlet disc into the upstream conduit member.

20. Apparatus according to claim 19 including means biasing the disc against the sealing surface.

References Cited

UNITED STATES PATENTS

| | | | |
|---|---|---|---|
| 3,521,476 | 7/1970 | Boissevain | 210—23 X |
| 3,570,672 | 3/1971 | Bach | 210—321 X |
| 3,370,710 | 2/1968 | Bluemle, Jr. | 210—321 |

FRANK A. SPEAR, Jr., Primary Examiner

U.S. Cl. X.R.

210—321